US006806920B2

(12) United States Patent
Hayashi et al.

(10) Patent No.: US 6,806,920 B2
(45) Date of Patent: Oct. 19, 2004

(54) LIQUID CRYSTAL DISPLAY APPARATUS (75) Inventors: Shunichiro Hayashi, Fukaya (JP); Satoru Yamanaka, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/205,472

(22) Filed: Jul. 26, 2002

(65) Prior Publication Data

US 2003/0030765 A1 Feb. 13, 2003

(30) Foreign Application Priority Data

Jul. 30, 2001 (JP) ....................................... 2001-230502
Dec. 13, 2001 (JP) ....................................... 2001-380619

(51) Int. Cl.⁷ ......................................... G02F 1/1333
(52) U.S. Cl. ............................. 349/58; 349/63; 362/31
(58) Field of Search ............................. 349/58, 63, 65; 362/31, 561

(56) References Cited

U.S. PATENT DOCUMENTS

| | | | | |
|---|---|---|---|---|
| 4,453,200 A | * | 6/1984 | Trcka et al. ................... | 362/31 |
| 5,889,623 A | * | 3/1999 | Ueda et al. ................... | 359/819 |
| 6,055,029 A | * | 4/2000 | Kurihara et al. .............. | 349/65 |
| 6,204,898 B1 | * | 3/2001 | Maeda ......................... | 349/63 |
| 6,352,350 B1 | * | 3/2002 | Ma .............................. | 362/19 |
| 6,474,823 B1 | * | 11/2002 | Agata et al. .................. | 362/26 |
| 6,498,631 B2 | * | 12/2002 | Natsuyama ................... | 349/62 |
| 6,553,100 B1 | * | 4/2003 | Chen et al. ................... | 379/37 |
| 6,573,956 B1 | * | 6/2003 | Shibata ........................ | 349/65 |
| 6,603,519 B2 | * | 8/2003 | Fukiharu ...................... | 349/63 |
| 6,685,328 B1 | * | 2/2004 | Hanson et al. ................ | 362/31 |

FOREIGN PATENT DOCUMENTS

JP        2000-284706        10/2000

* cited by examiner

Primary Examiner—Robert H. Kim
Assistant Examiner—Michael H. Caley
(74) Attorney, Agent, or Firm—Oblon, Spivak, McClelland, Maier & Neustadt, P.C.

(57) ABSTRACT

A liquid crystal display apparatus includes a liquid crystal panel in which a liquid crystal layer is interposed between a pair of substrates, a front light unit that illuminates the liquid crystal panel, and a cell case that cooperates with the front light unit to sandwich the liquid crystal panel. The front light unit comprises a light source section, a plate-shaped light guide body that guides light from the light source section to the liquid crystal panel, and a frame-shaped protection member mounted on a peripheral portion of the light guide body and engaged with the cell case, thus integrally holding the liquid crystal panel and the light guide body.

14 Claims, 9 Drawing Sheets

LIQUID CRYSTAL DISPLAY APPARATUS

CROSS-REFERENCE TO RELATED APPLICATIONS

This application is based upon and claims the benefit of priority from the prior Japanese Patent Applications No. 2001-230502, filed Jul. 30, 2001; and No. 2001-380619, filed Dec. 13, 2001, the entire contents of both of which are incorporated herein by reference.

BACKGROUND OF THE INVENTION

1. Field of the Invention

The present invention relates generally to a liquid crystal display (LCD) apparatus, and more particularly to a reflection type liquid crystal display apparatus having a front light.

2. Description of the Related Art

Jpn. Pat. Appln. KOKAI Publication No. 2000-284706, for instance, discloses a conventional LCD apparatus, which is a reflection type LCD apparatus having a front light as an auxiliary light source on a front face side of a reflection liquid crystal (LC) panel.

Figure 10:
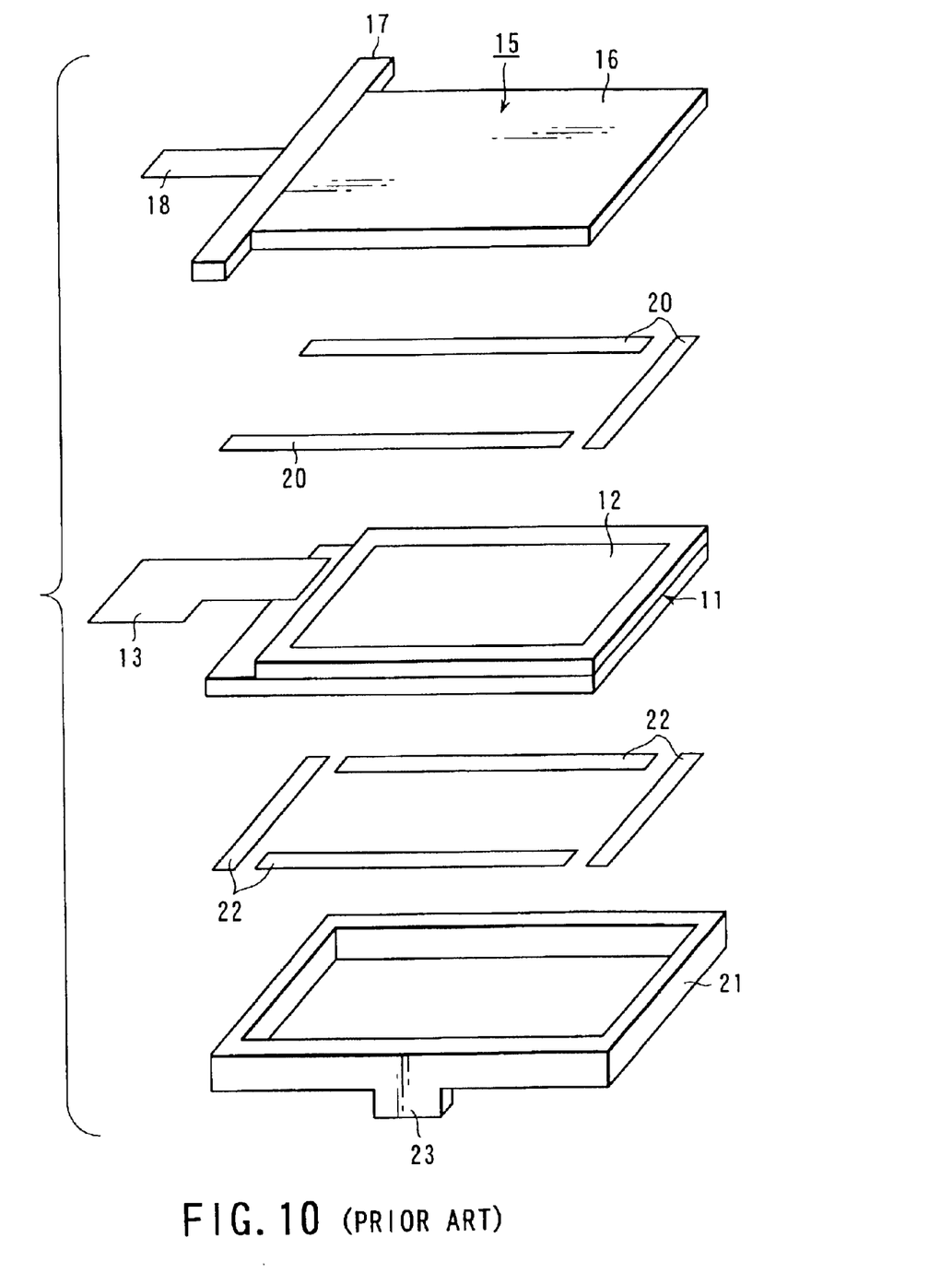
FIG. 10 is an exploded perspective view showing a prior-art LCD apparatus.

This reflection type LCD apparatus has a structure as shown in FIG. 10. A reflection type LC panel 11 is constructed such that a liquid crystal layer is interposed between a pair of substrates each having a thickness of 1 mm or less. One of the substrates has an integrally attached polarizing plate 12 on a front face side thereof. A flexible printed wiring board 13 is connected to the LC panel 11. The wiring board 13 supplies the LC panel 11 with electric signals and electric energy for driving the LC panel 11. The LC panel 11 is supplied with electric signals and electric energy from the printed wiring board 13, thereby displaying a desired image on a surface portion thereof.

A front light unit 15 comprises a light guide body 16 and a light source 17 provided on a side face of the light guide body 16. The light guide body 16 has a front surface provided with prism surface, and a back surface coated with an antireflective material. A flexible printed wiring board 18 is connected to the light source 17. The light source 17 is supplied with electric energy from the wiring board 18 and thus emits light. The light guide body 16 of front light unit 15 is fixed by one through four adhesive double-coated tapes 20 disposed on peripheral portions of the polarizing plate 12 of LC panel 11.

The LC panel 11, to which the front light unit 15 is integrally attached, is stored in a cell case 21. The LC panel 11 is integrally attached to the cell case 21 by one through four adhesive double-coated tapes 22 disposed within the cell case 21, and thus a module of these structural elements is formed. Claws 23 formed on the back face of the cell case 21 are used for fixation to a mobile phone or a portable information terminal (not shown).

In the LCD apparatus with the above structure, however, the light guide body 16 has to be directly held by a worker when the front light unit 15 is to be fixed to the surface portion of the LC panel 11 by the adhesive double-coated tapes 20. A problem may occur when the worker touches the light guide body 16, and the productivity of front light unit 15 may deteriorate.

Besides, there are gaps between the front light unit 15 and LC panel 11 at regions not surrounded by the double-coated tapes 20. Dust may easily enter through such gaps. If dust has entered, it is difficult to separate the front light unit 15 and LC panel 11 which are directly adhered. Consequently, dust may not be removed and the productivity of the LCD apparatus may deteriorate.

Figure 11:
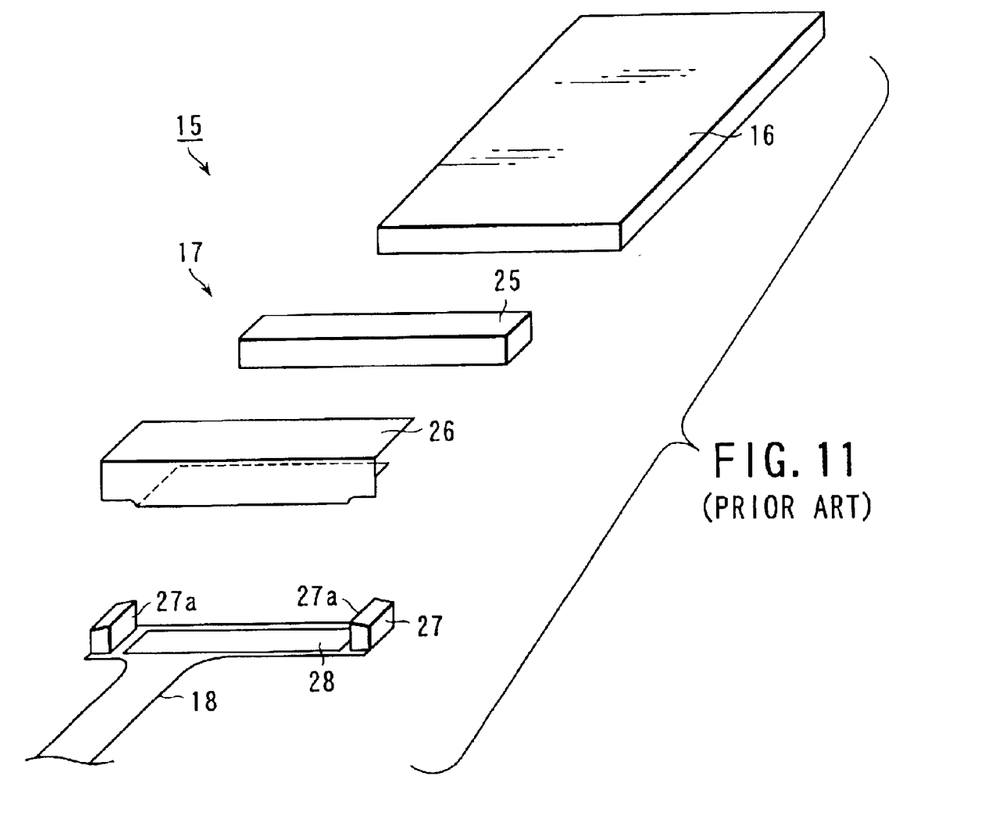
FIG. 11 is an exploded perspective view showing a front light unit used in the prior-art LCD apparatus.
Figure 12:
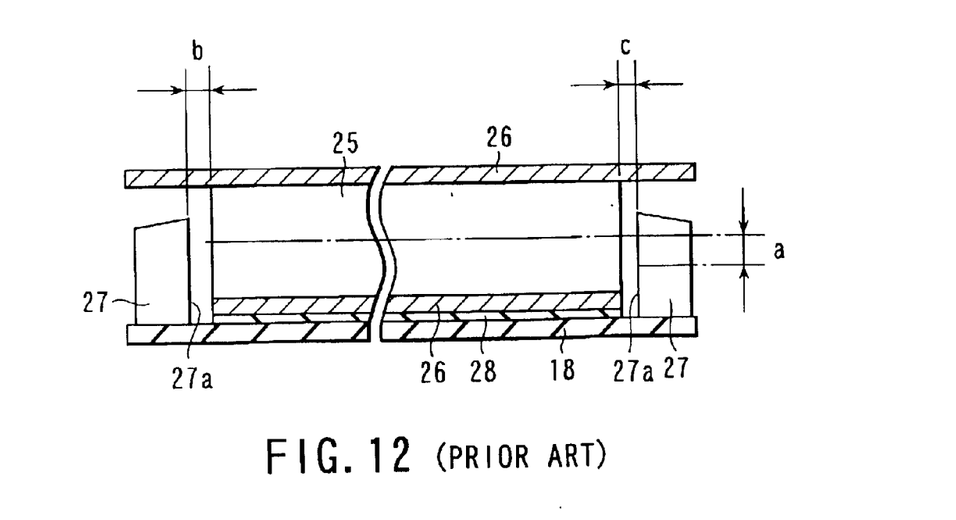
FIG. 12 is a cross-sectional view of the front light unit shown in FIG. 11.

As shown in FIGS. 11 and 12, the light source 17 of front light unit 15 comprises a light guide stick 25 disposed at one end of the light guide body 16, and a holder 26 which holds the light guide stick 25 and light guide body 16 as one piece. Light-emitting diodes (LEDs) 27 are disposed on both sides of the light guide stick 25 and mounted at both side portions of the printed wiring board 18 fixed on an outside face of the holder 26 by means of an adhesive double-coated tape 28. Light emanating from light emission faces 27a of LEDs 27 enters end faces of the light guide stick 25, which are opposed to the light emission faces 27a. Then, light emitted from the light guide stick 25 enters one end face of the light guide body 16. Thus, the light guide body 16 emits light.

The light guide stick 25 is simply held by the holder 26 and is not fixed. As a result, the positional relationship between the light guide stick 25 and light guide body 16 tends to vary, and the efficiency of light incidence from the light guide stick 25 to the light guide body 16 may deteriorate.

In addition, the double-coated tape 28 and holder 26 are interposed between the printed wiring board 18, on which the LEDs 27 are mounted, and the light guide stick 25. Thus, there is a difference a in dimension between the center axis of the light emission face 27a of each LED 27 and the center axis of the end face of the light guide stick 25. Consequently, the efficiency of light incidence from the LEDs 27 to the light guide stick 25 decreases and the loss in light increases.

Furthermore, the location of each LED 27 on the printed wiring board 18 is not exactly determined and is variable. It is thus necessary to provide relatively large gaps b and c between the light emission faces 27a of LEDs 27, on the one hand, and the end faces of the light guide stick 25, on the other. However, if the gaps b and c are great, the efficiency of light incidence from the LEDs 27 to the light guide stick 25 decreases and the loss in light increases.

As has been described above, with the conventional LCD apparatus, the productivity of the front light unit 15 may decrease, and the efficiency of light incidence from the LEDs 27 to the light guide body 16 may decrease. Owing to such problems of the front light unit 15, the productivity of the LCD apparatus may decrease.

BRIEF SUMMARY OF THE INVENTION

The present invention has been made to solve the above problems, and its object is to provide a liquid crystal display apparatus wherein a problem will hardly occur in a front light unit, contributing to an increase in productivity.

According to an aspect of the invention, there is provided a liquid crystal display apparatus including:

a liquid crystal panel in which a liquid crystal layer is interposed between a pair of substrates;

a front light unit that illuminates the liquid crystal panel; and a cell case that cooperates with the front light unit to sandwich the liquid crystal panel, wherein the front light unit comprises a light source section, a plate-shaped light guide body that guides light from the light source section to the liquid crystal panel, and a frame-shaped protection member mounted on a peripheral portion of the light guide body and engaged with the cell case, integrally holding the liquid crystal panel and the light guide body.

According to this LCD apparatus, the frame-shaped protection member is attached to the peripheral portion of the light guide body, and the liquid crystal panel is disposed between the protection member and the cell case. In this state, the protection member is engaged with the cell case, whereby the liquid crystal panel and the light guide body are integrally held. Thus, at the time of fabrication, a manufacturing worker can handle the front light unit by holding the protection member, without directly touching the light guide body. Therefore, problems hardly occur with the front light unit, and the productivity increases.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the liquid crystal display (LCD) apparatus according to the present invention will now be described in detail with reference to the accompanying drawings.

(First Embodiment)

Figure 1:
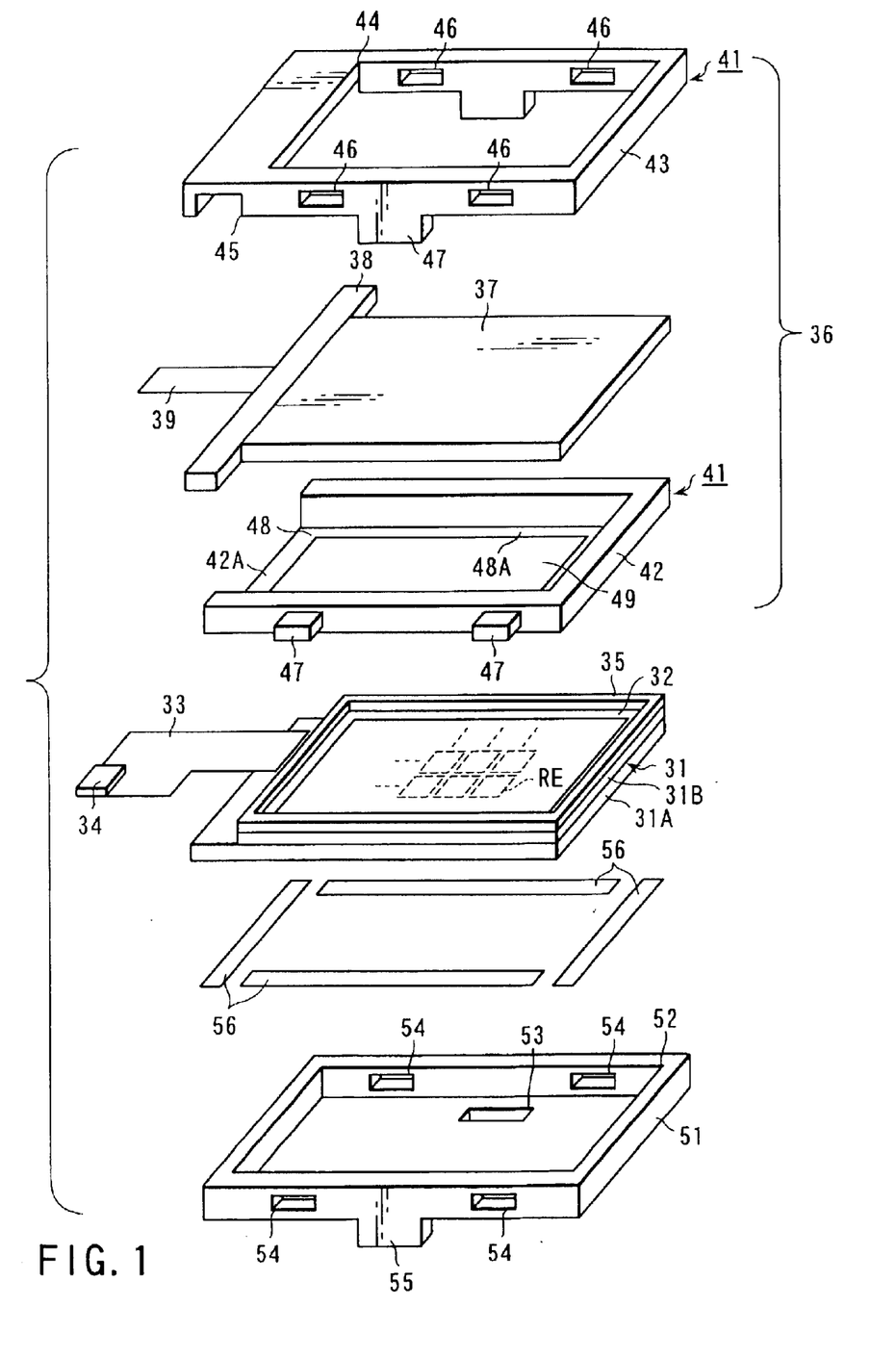
FIG. 1 is an exploded perspective view schematically showing the structure of an LCD apparatus according to a first embodiment of the present invention.

As is shown in FIG. 1, a LCD apparatus according to a first embodiment of the invention comprises a reflection type liquid crystal (LC) panel 31 having a planar surface, a front light unit 36 and a cell case 51. The LC panel 31 is constructed such that a liquid crystal layer is interposed between a pair of substrates each having a thickness of 1 mm or less, that is, an array substrate 31A and a counter-substrate 31B. The array substrate 31A includes reflection electrodes RE arranged in a matrix. The reflection electrodes RE are formed of a metallic material with light reflectivity, which reflects light made incident in the liquid crystal layer from the counter-substrate 31B side. The counter-substrate 31B has an integrally attached polarizing plate 12 on a front face thereof.

A flexible printed wiring board 33 is connected to the LC panel 31. The wiring board 33 supplies the LC panel 31 with electric signals and electric energy for driving the LC panel 31. The LC panel 31 is supplied with electric signals and electric energy from the printed wiring board 33, thereby displaying a desired image on a surface portion thereof. A connector 34 is provided at a distal end portion of the printed wiring board 33.

A frame member 35 is attached to a front surface side of the LC panel 31, that is, to an outer peripheral portion of the counter-substrate 31B to which the polarizing plate 32 is attached. The frame member 35 may be formed of an elastic material such as sponge, or a frame-shaped adhesive double-coated tape. The use of an elastic material for the frame member 35 makes assembly easier. The frame member 35 has such a height that it projects from the polarizing plate 32. For example, the thickness of the polarizing plate 32 is about 0.4 mm and the height of the frame member 35 is about 0.5 mm to 0.8 mm. Thereby, a clearance is kept between a light guide body 37 and the LC panel 31.

Where an adhesive double-coated tape is used for the frame member 35, the adhesion between the LC panel 31 and protection member 41 is enhanced, and entrance of dust is more surely prevented. In this case, the shape of a rear case 42 is adjusted in accordance with the thickness of the adhesive double-coated tape, and a clearance between the light guide body 37 and LC panel 31 is kept.

The front light unit 36 is disposed on the frame member 35. The frame member 35 is interposed between the front light unit 36 and LC panel 31 and seals their peripheral portions without a gap. Thereby, dust is prevented from entering between the front light unit 36 and LC panel 31.

The front light unit 36 is provided on the front face side of the LC panel 31 and illuminates the LC panel 31. The front light unit 36 comprises a light source section 38, a plate-shaped light guide body 37 and a frame-like protection member 41. The light guide body 37 guides light from the light source section 38 to the LC panel 31. The light guide body 37 has a front surface provided with prism surface, and a back surface coated with an antireflective material. The light guide body 37 is formed of, e.g. a transparent plate-shaped member of an acrylic resin. The light source section 38 is provided on one side face of the light guide body 37. The light source section 38 comprises a light guide stick disposed to face one side face of the light guide body 37, at least one light-emitting diode (LED) disposed at each of both ends of the light guide stick, and a metal frame covering the peripheral portions of these elements. A printed wiring board 39 is connected to the light source section 38. A distal end portion of the printed wiring board 39 is electrically and mechanically connected to the connector 34 of printed wiring board 33 of LC panel 31. The light source section 38 is supplied with electric energy from the printed wiring board 39, thereby emitting light.

The protection member 41 is mounted on a peripheral portion of the light guide body 37 and engaged with the cell case 51, thus integrally supporting the LC panel 31 and light guide body 37. Specifically, the protection member 41 comprises rear case 42 and front case 43. The rear case 42 serves as a frame-shaped first protection body disposed on one major surface, i.e. a back surface, of the light guide body 37. The front case 43 serves as a frame-shaped second protection body disposed on the other major surface, i.e. a front surface, of the light guide body 37. The rear case 42 and front case 43 clamp the light guide body 37. The rear case 42 and front case 43 are formed of a metal or plastic material.

The front case 43 is formed to accommodate the light guide body 37. The front case 43 has an opening 44 defined to conform to the shape of the light guide body 37. The opening 44, for example, is defined to be rectangular in accordance with the light guide body 37 having a rectangular major surface on the front case 43 side. The front case 43 has a notch 45 formed to correspond to the shape of the light source section 38. The front case 43 also has an insertion hole for insertion of the printed wiring board 39 of light source section 38 and the printed wiring board 33 of LC panel 31. In addition, the front case 43 has a plurality of engagement holes 46 for coupling with the rear case 42, and claw-shaped attachment portions 47 for attachment to the cell case 51. Two or more engagement holes 46 are formed in each of both side surfaces of front case 43. The attachment portions 47 project from both side portions of front case 43 toward the back face side.

The rear case 42 comprises a receiving portion 48 for receiving the light guide body 37, and a rectangular opening portion 49 formed to conform to the shape of the light guide body 37. The receiving portion 48 has a recessed shape corresponding to the rectangular shape of the light guide body 37. The receiving portion 48 has a support face 48A that supports the light guide body 37 and defines the opening portion 49. One side portion 42A of the rectangular rear case 42 has a smaller thickness than the other side portions. The side portion 42A is flush with the support face 48A. The light guide body 37 is disposed on the support face 48A of receiving portion 48 and the thin side portion 42A. In addition, the light guide body 37 is surrounded by the other side portions of rear case 42. The rear case 42 has attachment portions 47. The attachment portion 47 project outward from both side portions of the rear case 42. At least one attachment portion 47 is provided on each of the side portions of rear case 42. The same attachment portion 47 may be engaged with both the engagement hole 46 of front case 43 and the associated engagement hole 54 of cell case 51. Alternatively, a predetermined attachment portion 47 may be engaged with the engagement hole 46 of front case 43, and another attachment portion 47 may be engaged with the engagement hole 54 of cell case 51.

The cell case 51 has a receiving recess portion 52. The LC panel 31 and front light unit 36 are integrally received in the recess portion 52 as a module. The cell case 51 has engagement holes 53 for engagement with the attachment portions 47 of front case 43, engagement holes 54 for engagement with the attachment portions 47 of rear case 42, and attachment portions 55. The engagement holes 53 are formed in the bottom surface of the cell case 51. The engagement holes 54 are formed in side surfaces of the cell case 51. The attachment portions 55 project from the bottom of the cell case 51 to the back side. The attachment portions 55 are used for fixation to an object for attachment, e.g. a mobile phone or a portable information terminal (not shown). The LC panel 31 is firmly attached to a predetermined position within the receiving recess portion 52 of cell case 51 by means of at least one adhesive double-coated tape 56 disposed on a back-side peripheral portion of the LC panel 31.

A method of assembling the LCD apparatus according to the first embodiment will now be described.

To start with, the front light unit 36 is assembled. The frame-shaped protection member 41 is attached to the peripheral portion of the light guide body 37. At this time, the rear case 42 is attached from the back side of light guide body 37. The front case 43 is attached from the front side of light guide body 37. The opening portion 44 is opposed to the light guide body 37, and the light source section 38 is fitted in the notch 45. The attachment portions 47 projecting from the rear case 42 are engaged in the engagement holes 46 of front case 43. Thereby, the front and back faces of the light guide body 37 are clamped by the protection member 41. The printed wiring board 33 is led out of the insertion hole of front case 43.

On the other hand, the LC panel 31 is firmly attached to a predetermined position within the receiving recess portion 52 of cell case 51 by means of the adhesive double-coated tape 56.

Subsequently, the front light unit 36 is mounted on the front side of the LC panel 31 set in the cell case 51, using the protection member 41 attached to the light guide body 37. Specifically, the claw-shaped attachment portions 47 projecting from the back face of front case 43 are engaged in the engagement holes 53 formed in the bottom part of the cell case 51, and the attachment portions 47 of rear case 42 are engaged in the engagement holes 54 of cell case 51. Thereby, the light guide body 37 of front light unit 36 is so mounted as to be opposed to the front surfaced of LC panel 31. Since the frame member 35 attached to the peripheral portion of LC panel 31 is elastically compressed and put in contact with the rear case 42 that holds the light guide body 37, dust is prevented from entering between the front light unit 36 and LC panel 31.

The printed wiring board 33 of LC panel 31 is led out of the insertion hole or notch (not shown) in the front case 43. Then, the printed wiring board 39 of front light unit 36 is electrically and mechanically connected to the connector 34 of printed wiring board 33 of LC panel 31. It is not necessary that the printed wiring boards 33 and 39 be connected via the connector 34, and they may be individually connected to external circuit boards.

The LCD apparatus, which is formed as a module, is fixed to a mobile phone or a portable information terminal (not shown) by the attachment portions 55 provided on cell case 51.

In this LCD apparatus, light emitted from the LEDs of light source section 38 is guided by the light guide stick and then by the light guide body 37 in a planar fashion. The light guided by the light guide body 37 is emitted toward the reflection type LC panel 31 from the back face of light guide body 37. Thereby, the LC panel 31 is illuminated on this front surface side having the polarizing plate 32. The light incident on the LC panel 31 is reflected by the reflection electrodes RE disposed within the LC panel 31 and selectively emitted from the LC panel 31. Thus, an image is displayed.

According to the first embodiment, the frame-shaped protection member 41 is attached to the peripheral portion of light guide body 37. At the time of assembling, the front light unit 36 is handled by holding the protection member 41. Unlike the case of handling the light guide body by directly holding it, no problem occurs with the light guide body 37 and the productivity of the front light unit 36 is enhanced.

The frame-shaped protection member 41 comprises the rear case 42 and front case 43 formed of metal or plastic material. The front and back surfaces of light guide body 37 are firmly held by the front case 43 and rear case 42. Therefore, the function of protecting the light guide member 37 is enhanced, and no problem occurs with the front light unit 36.

When the front light unit 36 is mounted on the front surface side of LC panel 31, the attachment portions 47 of front case 43 are engaged in the engagement holes 53 of cell case 51 and the attachment portions 47 of rear case 42 are engaged in the engagement holes 54 of cell case 51. Thereby, the front light unit 36 and LC panel 31 are directly attached to the cell case 51. Accordingly, the front light unit 36 can easily be removed from the front surface side of LC panel 31 by disengaging the attachment portions 47 of front case 43 from the engagement holes 53 and the attachment portions 47 of rear case 42 from the engagement holes 54. Besides, the frame member 35 prevents dust from entering between the LC panel 31 and front light unit 36. Even if dust enters between the LC panel 31 and front light unit 36, such dust can easily be removed and the productivity is enhanced.

(Second Embodiment)

Figure 2:
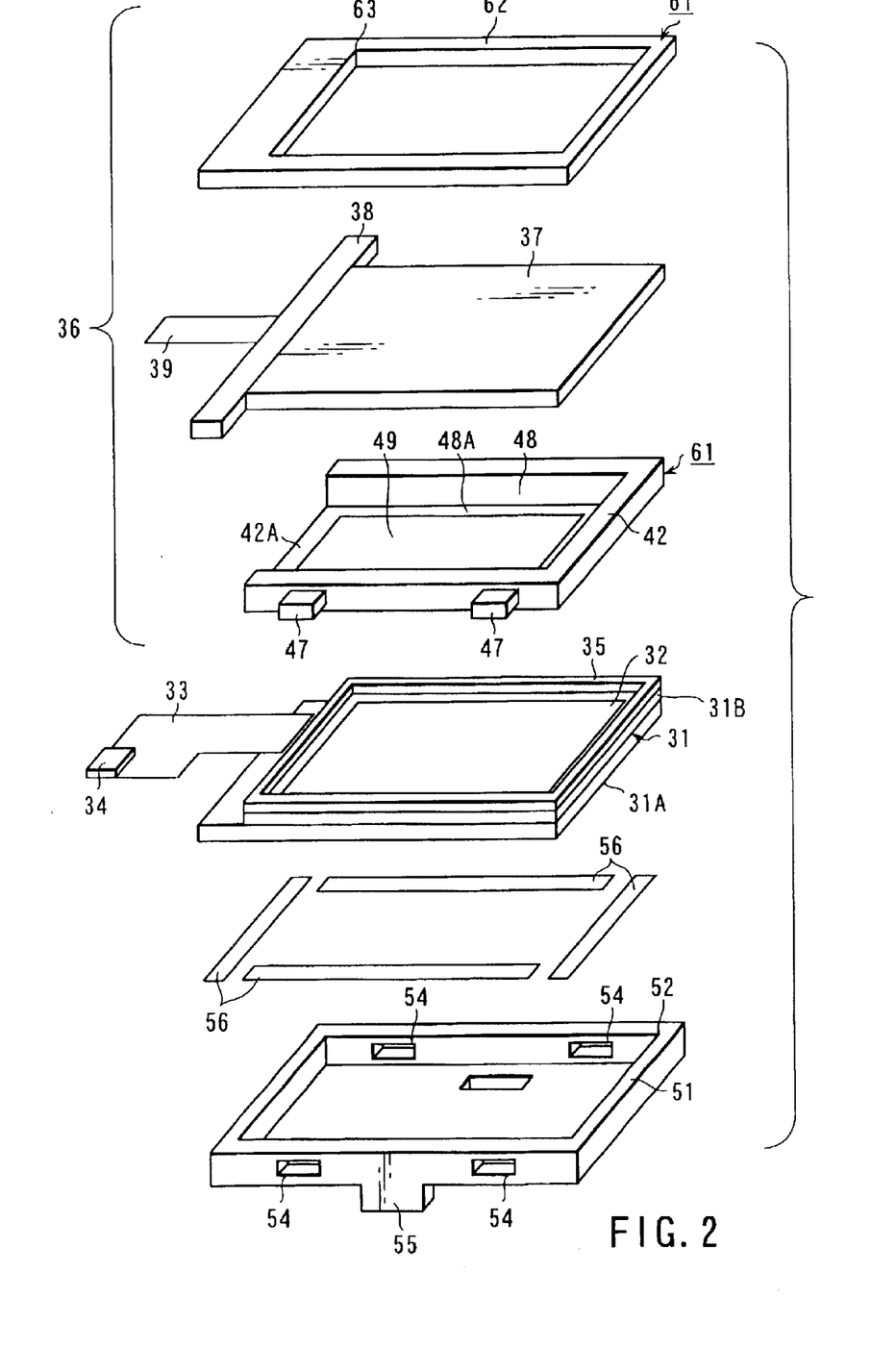
FIG. 2 is an exploded perspective view schematically showing the structure of an LCD apparatus according to a second embodiment of the present invention.

As is shown in FIG. 2, a second embodiment of the invention differs from the first embodiment shown in FIG. 1 with respect to the structure of the protection member. The structural parts common to those in the first embodiment are denoted by like reference numerals and a detailed description thereof is omitted.

A frame-shaped protection member 61 comprises a rear case 42 serving as a frame-shaped first protection body disposed on the back side of the light guide body 37, and a frame-shaped film 62 serving as a frame-shaped second protection body disposed on the front side of light guide body 37. The light guide body 37 is sandwiched by the rear case 42 and frame-shaped film 62.

The frame-shaped film 62 has an opening portion 63 corresponding to a display section of the LC panel 31. The opening portion 63 is formed to correspond to the shape of light guide body 37. The opening portion 63 is formed, for example, in a rectangular shape so as to correspond to the light guide body 37 having a rectangular major surface on the frame-shaped film 62 side. It is desirable that the area of the opening portion 63 be less than the effective area, i.e. the area of the major surface, of the light guide body 37. Thereby, at least a part of the frame-shaped film 62 covers the peripheral portion of the light guide body 37 and the upper surface of the rear case 42 surrounding the light guide body 37. The back face of the film 62 is provided with an adhesive material or an adhesive double-coated tape. Thereby, the frame-shaped film 62 is adhered to the peripheral portion of light guide body 37 and the rear case 42 surrounding the light guide body 37.

The frame-shaped film 62 does not have attachment portions projecting to the back face side. Nor does the bottom surface of cell case 51 have engagement holes for engagement with such attachment portions.

A method of assembling the LCD apparatus according to the second embodiment will now be described.

Basically, like the first embodiment shown in FIG. 1, when the protection member 61 is attached to the light guide body 37, the rear case 42 is attached from the back side of light guide body 37. In addition, the frame-shaped film 62 is disposed to cover the peripheral portion of the light guide body 37 from the front side of light guide body 37. By the adhesive material, the frame-shaped film 62 is attached to the peripheral portion of light guide body 37 and the rear case 42. Thus, the front and rear sides of light guide body 37 are sandwiched by the frame-shaped film 62 and rear case 42.

Subsequently, when the front light unit 36 is laid over the front surface of the LC panel 31, the attachment portions 47 of rear case 42 attached to the light guide body 37 are engaged in the engagement holes 54 of cell case 51.

The basic function and advantage of the second embodiment are the same as those of the first embodiment shown in FIG. 1. In addition to the first embodiment, in the second embodiment, since the front case 43 is replaced with the frame-shaped film 62, the film 62 can be simply attached to the rear case without engagement. Thus, the productivity is enhanced. Furthermore, since the frame-shaped film 62 is more easily fabricated than the front case 43, the manufacturing cost can be reduced.

(Third Embodiment)

Figure 3:
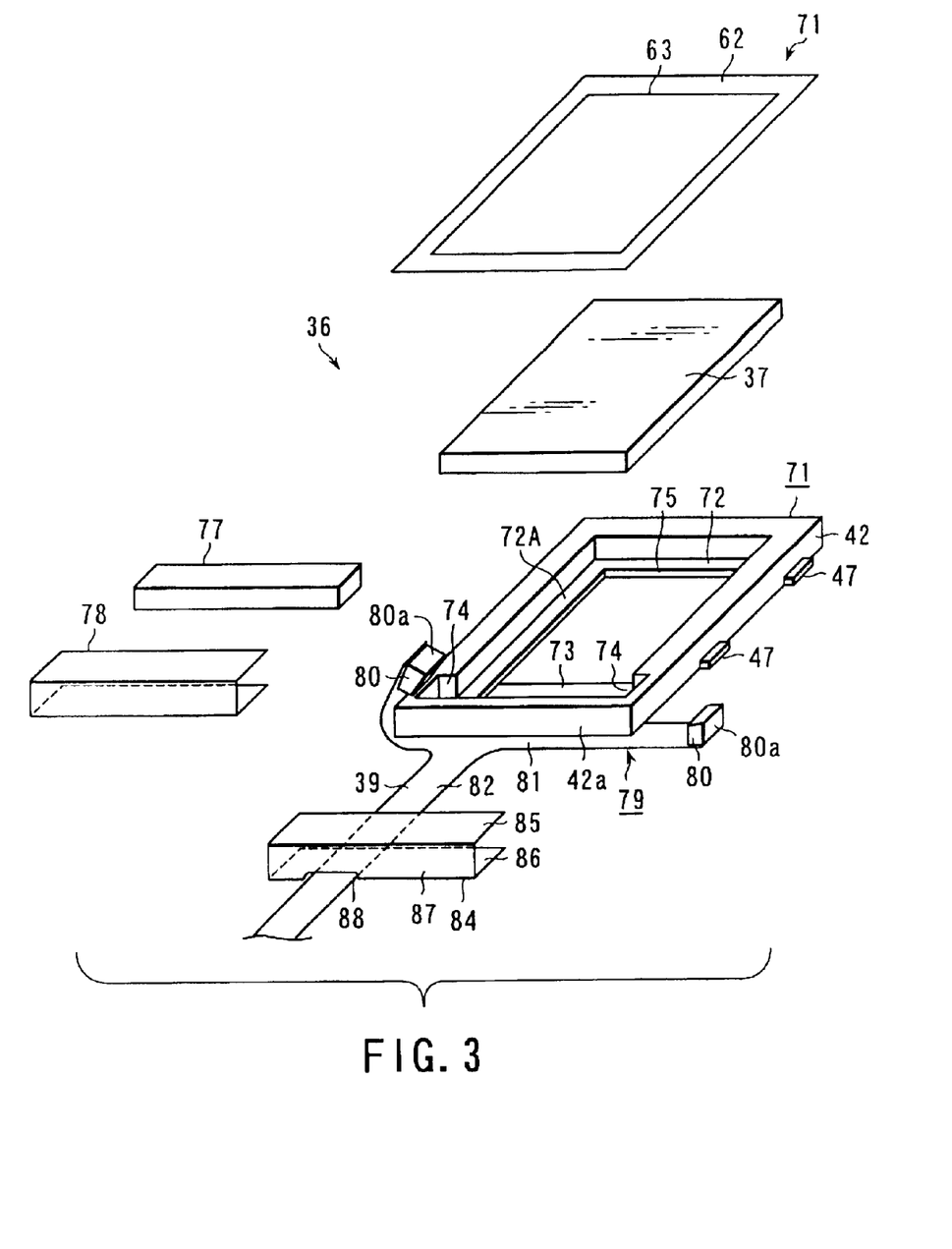
FIG. 3 is an exploded perspective view schematically showing the structure of a front light unit used in an LCD apparatus according to a third embodiment of the invention.
Figure 4:
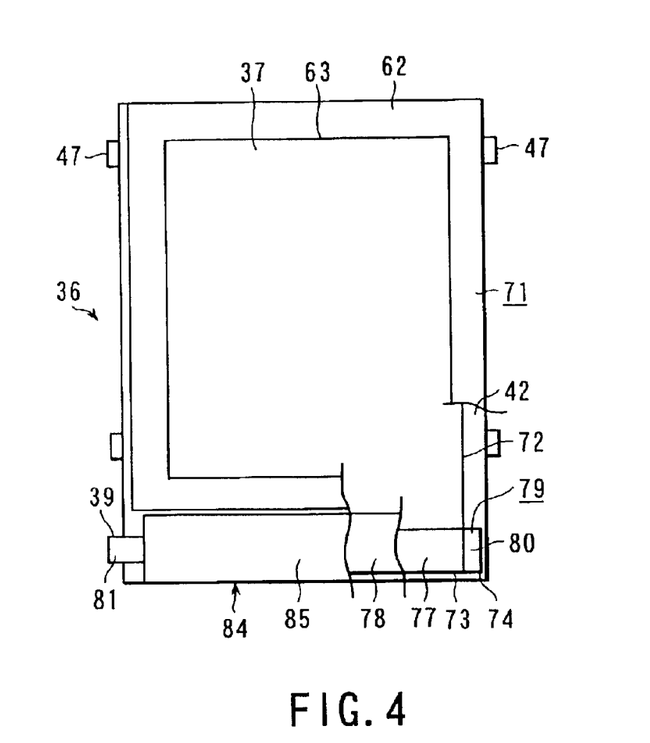
FIG. 4 is a plan view of the front light unit shown in FIG. 3.
Figure 5:
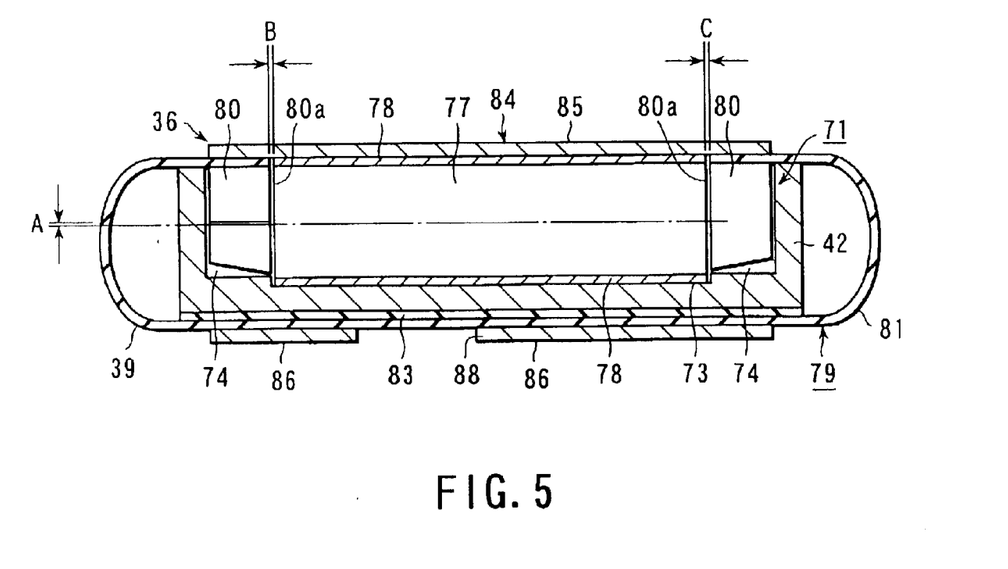
FIG. 5 is a cross-sectional view of the front light unit shown in FIG. 3.

As is shown in FIGS. 3 to 5, a third embodiment of the invention differs from the second embodiment with respect to the structures of the front light unit 36 and protection member 71.

The protection member 71 comprises a rear case 42 that supports the back face of the light guide body 37, and a frame-shaped film 62 that covers the peripheral portion of light guide body 37 from the front side.

The rear case 42 includes a light guide body receiving portion 72 for receiving the light guide body 37, a light guide stick receiving portion 73 for receiving the light guide stick 77, and light emitting diode receiving portions 74 for receiving light emitting diodes (LEDs) 80. The light guide body receiving portion 72 is formed as a rectangular recess corresponding to the rectangular light guide body 37. The light guide stick receiving portion 73 is formed along one end of the light guide body receiving portion 72. The light guide stick receiving portion 73 is formed as a recess corresponding to the shape of the light guide stick 77 extending along one end of the light guide body 37. The LED receiving portions 74 are formed at both ends of the light guide stick receiving portion 73. The LED receiving portions 74 are formed as recesses corresponding to the shape of LEDs 80. The receiving portions 72 to 74 are open to the front side of rear case 42, and the respective parts can be mounted from the front side. The light guide body receiving portion 72 defines an opening portion 75 corresponding to the display section of LC panel 31. The light guide body receiving portion 72 has a support face 72A that supports the light guide body 37. The light guide stick receiving portion 73 retreats from the LED receiving portions 74.

The light guide stick 77 is formed of, e.g. transparent acrylic resin in a stick shape. The light guide stick 77 is disposed along one end of the light guide body 37. The light guide stick 77 is covered with a thin bent reflection sheet 78, except one face thereof opposed to light guide body 37 and both end faces. The reflection sheet 78 reflects light incident on the light guide stick 77 toward the light guide body 37.

The LEDs 80, which constitute parts of a light emission section 79, are disposed such that its light emission faces 80a are opposed to both end faces of the light guide stick 77. Each LED 80 is mounted on the printed wiring board 39. The printed wiring board 39 comprises a wiring portion 81 with a greater width than the rear case 42, and a lead-out portion 82 extending from a middle portion of the wiring portion 81 in a perpendicular direction. The LEDs 80 are mounted at both ends of the wiring portion 81, with their light emission faces 80a directed to the outside. An intermediate portion of the wiring portion 81 is adhered to a back face of one end portion of the rear case 42 by means of an adhesive double-coated tape 83.

The light guide stick 77 and light emitting section 79 are mounted in the rear case 42 and held therein by a holder 84 that hold them from the outside. The holder 84 is formed of, e.g. a metal. The holder 84 comprises a front side holder portion 85 that covers the front side of the rear case 42, a back side holder portion 86 that covers the back side of the rear case 42, and a connecting portion 87 that connects the holder portions 85 and 86 and is disposed along one end portion 42a of rear case 42. The holder portion 86 and connecting portion 87 include a notch portion 88 from which the lead-out portion 82 of printed wiring board 39 is led out.

A method of assembling the front light unit 36 will now be described.

The light guide body 37 is contained in the light guide body receiving portion 72 from the front side of the rear case 42. At the same time, the light guide stick 77, to which the reflection sheet 78 is attached, is contained in the light guide stick receiving portion 73. Then, the light guide body 37 and light guide stick 77 are aligned. The intermediate portion of the wiring portion 81 is fixed to the back surface of rear case 42 by means of the adhesive double-coated tape 83. Both end portions of the wiring portion 81 are bent, and the LEDs 80 mounted on both end portions of the wiring portion 81 are put in the LED receiving portions 74 from the front side of the rear case 42. The LEDs 80 are aligned such that the light emission faces 80a of LEDs 80 oppose the end faces of light guide stick 77.

The holder 84 is fitted on the end portion 42a of rear case 42. The holder 84 thus integrally holds the light guide stick 77, the printed wiring board 39 of LEDs 80, and the rear case 42. The frame-shaped film 62 is attached to the peripheral portion of light guide body 37 and the rear case 42. Thus, the light guide body 37 is fixed to the rear case 42.

According to the third embodiment, the same operational advantages as with the first embodiment are obtained. In addition, in the third embodiment, the light guide body 37, light guide stick 77 and LEDs 80 are contained in the receiving portions 72 to 74 of rear case 42, and these elements are held by the frame-shaped film 62 and holder 84. The positional relationship between the light guide body 37 and light guide stick 77 as well as between the light guide stick 77 and LEDs 80 can be kept constant. This positional relationship is not affected by displacement of the holder 84, and the optical effect is reduced. In particular, since the positional relationship between the light guide stick 77 and each LED 80 is determined by the rear case 42, gaps B and C between the end faces of light guide stick 77 and the light emission faces 80a of LEDs 80 can be reduced. Therefore, the efficiency of light incidence from LEDs 80 to light guide stick 77 is increased and the optical loss is decreased.

Besides, since the light guide stick 77 and light emitting section 79 mounted in the rear case 42 are held by the holder 84 from the outside, the drawback of the prior art as shown in FIG. 12 is eliminated. In the prior art, the displacement a occurs between the center axis of the light emission face 27a of LED 27 and the center axis of the end face of light guide stick 25. According to the third embodiment, when the light guide stick 77 and LEDs 80 are held by the holder 84, they are individually arranged and the displacement A between the center axis of light emission face 80a of LED 80 and the center axis of the end face of light guide stick 77 can be decreased. Therefore, the efficiency of light incidence from the LEDs 80 to light guide stick 77 can be enhanced, and the optical loss reduced.

As stated above, the efficiency of light incidence from the LEDs 80 to light guide stick 77 can be enhanced, a sufficient amount of emission light is obtained from the light guide body 37, and no problems occur with the front light unit.

(Fourth Embodiment)

Figure 6:
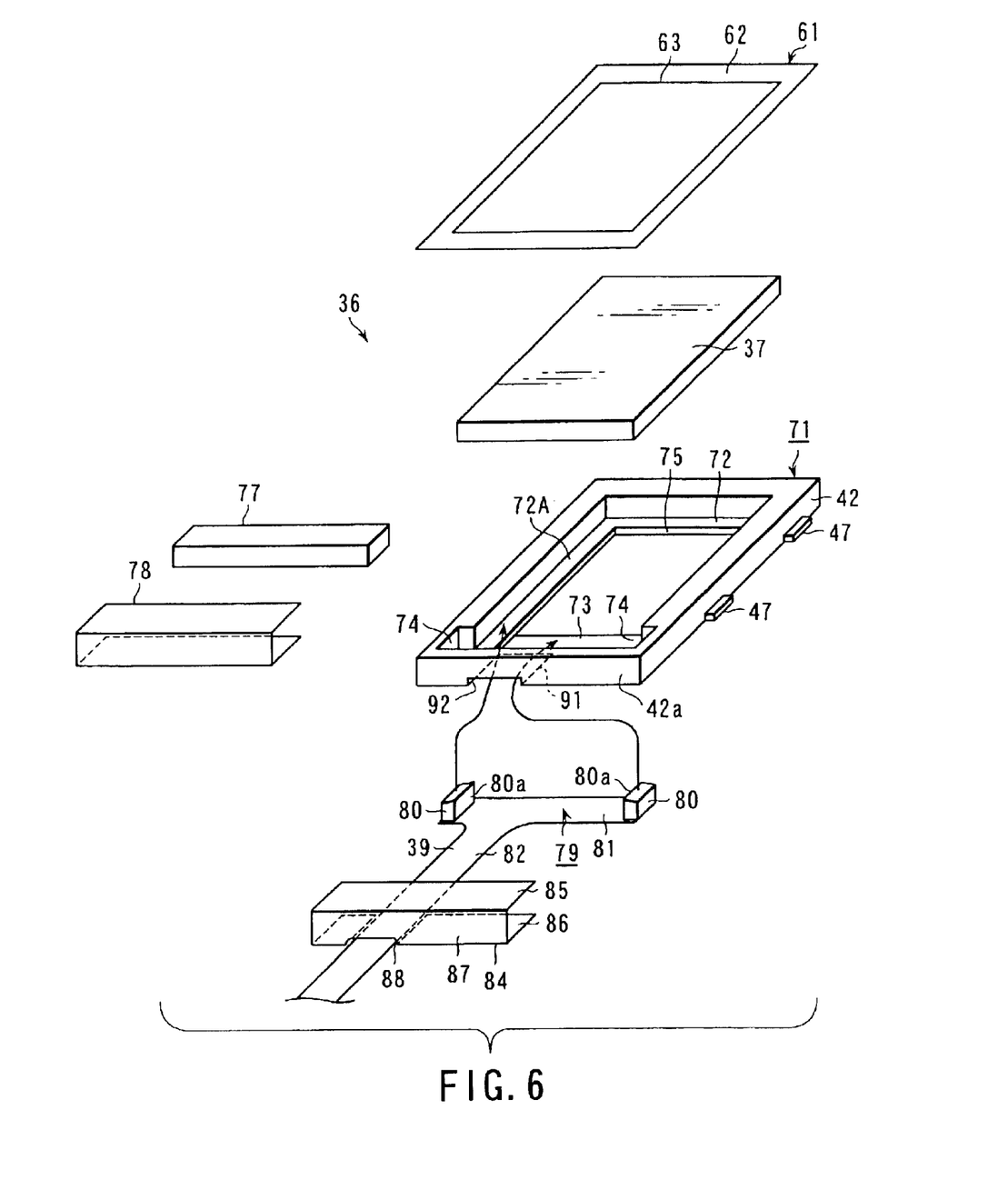
FIG. 6 is an exploded perspective view schematically showing the structure of a front light unit used in an LCD apparatus according to a fourth embodiment of the invention.
Figure 7:
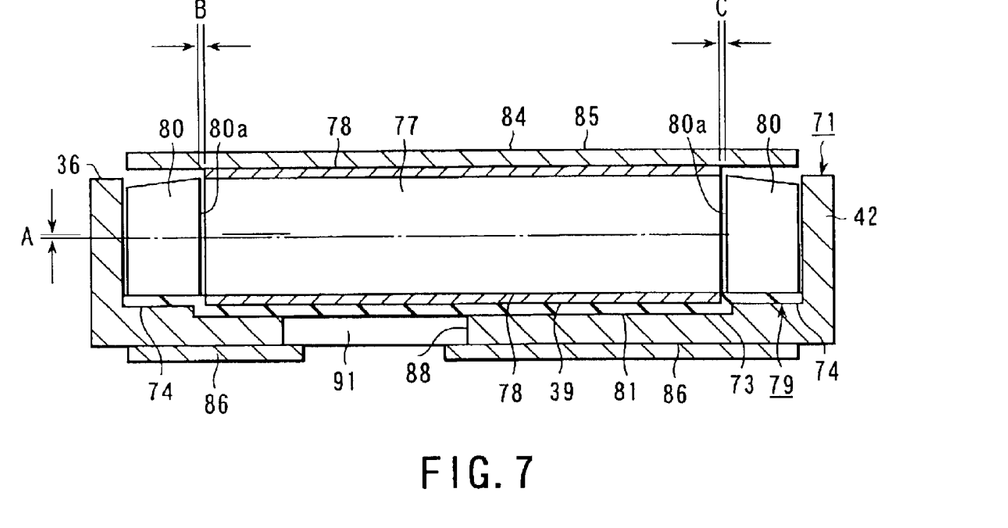
FIG. 7 is a cross-sectional view of the front light unit shown in FIG. 6.

As is shown in FIGS. 6 and 7, a fourth embodiment of the invention differs from the third embodiment with respect to the structures of the rear case 42 and light emitting section 79.

The rear case 42 has an insertion hole 91 at the bottom surface of the light guide stick receiving portion 73. The LEDs 80 and wiring portion 81 of printed wiring board 39 can be inserted through the insertion hole 91. The end portion 42a of rear case 42 has an insertion groove 92 communicating with the insertion hole 91 formed on the bottom side. The lead-out portion 82 of printed wiring board 39 is led out through the insertion groove 92.

The wiring portion 81 of printed wiring board 39 has a length corresponding to the length between the LED receiving portions 74 at both ends of the light guide stick receiving portion 73. The LEDs 80 are mounted on both end portions of the wiring portion 81, with their light emission faces 80a being directed inward.

A method of assembling the light source section 38 of front light unit 36 will now be described.

The LEDs 80 and wiring portion 81 of printed wiring board 39 are inserted from the back side to the front side through the insertion hole 91 of rear case 42. The lead-out portion 82 of printed wiring board 39 is inserted from the front side through the insertion hole 91 of rear case 42. The wiring portion 81 of printed wiring board 39 is disposed on bottom surfaces of the light guide receiving portion 73 and LED receiving portions 74 of rear case 42. The LEDs 80 provided at both end portions of the wiring portion 81 are put in the LED receiving portions 74 of rear case 42.

Subsequently, the light guide stick 77, to which the reflection sheet 78 is attached, is placed in the light guide stick receiving portion 73 of rear case 42. In this case, the interval between the LEDs 80 is preset to correspond to the longitudinal length of the light guide stick 77 by the length of the wiring portion 81. Thus, the light guide stick 77 contained in the light guide stick receiving portion 73 is disposed at a predetermined position relative to the LEDs 80.

The holder 84 is fitted on the end portion 42a of rear case 42. The holder 84 integrally holds the light guide stick 77, the printed wiring board 39 of LEDs 80, and the rear case 42.

According to the fourth embodiment, the same operational advantages as with the third embodiment are obtained. In addition, since the LEDs 80 and light guide stick 77 can be positioned with the predetermined positional relationship, the efficiency of light incidence from the LEDs 80 to light guide stick 77 can be enhanced, a sufficient amount of emission light is obtained from the light guide body 37, and no problems occur with the front light unit.

(Fifth Embodiment)

Figure 8:
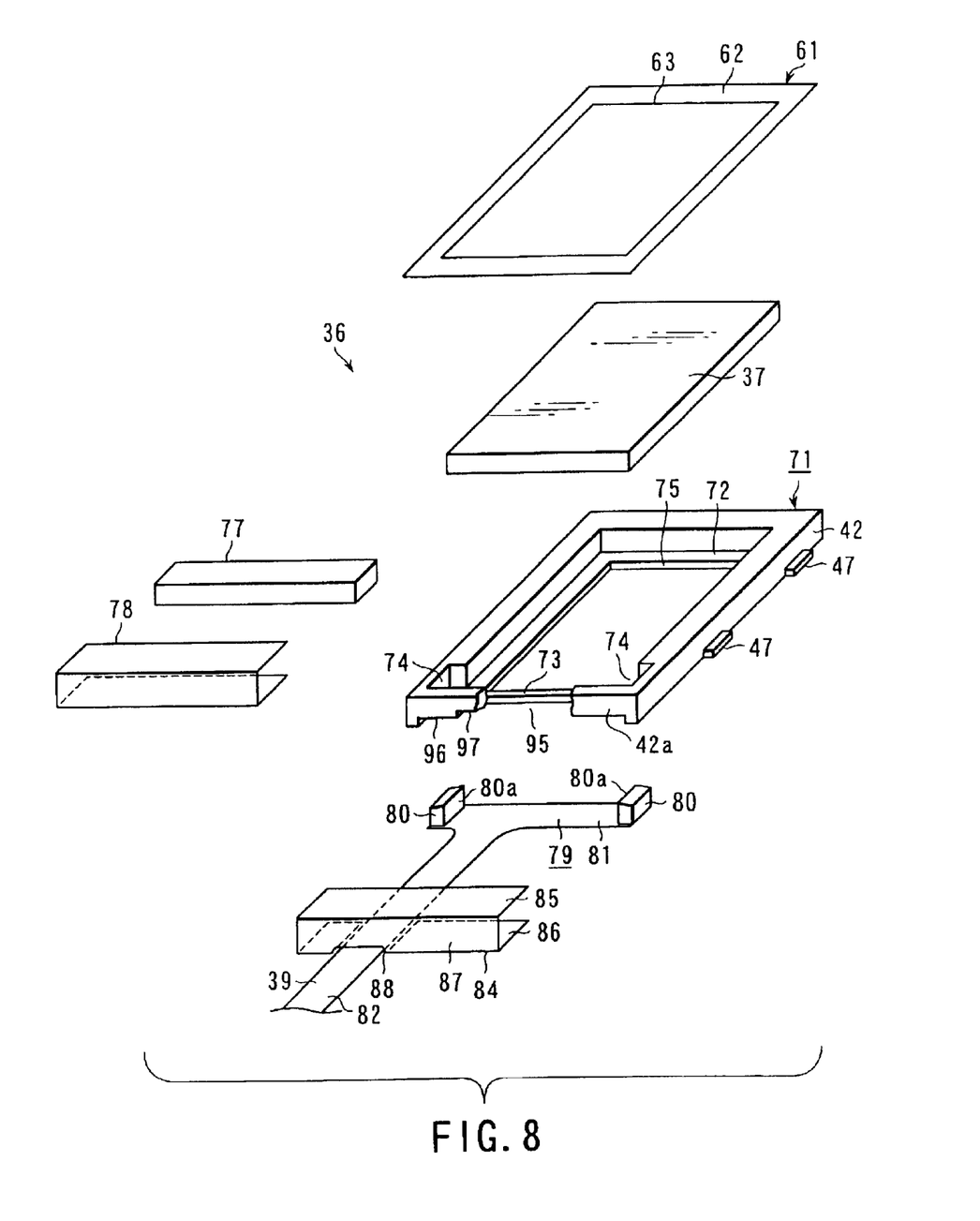
FIG. 8 is an exploded perspective view schematically showing the structure of a front light unit used in an LCD apparatus according to a fifth embodiment of the invention.
Figure 9:
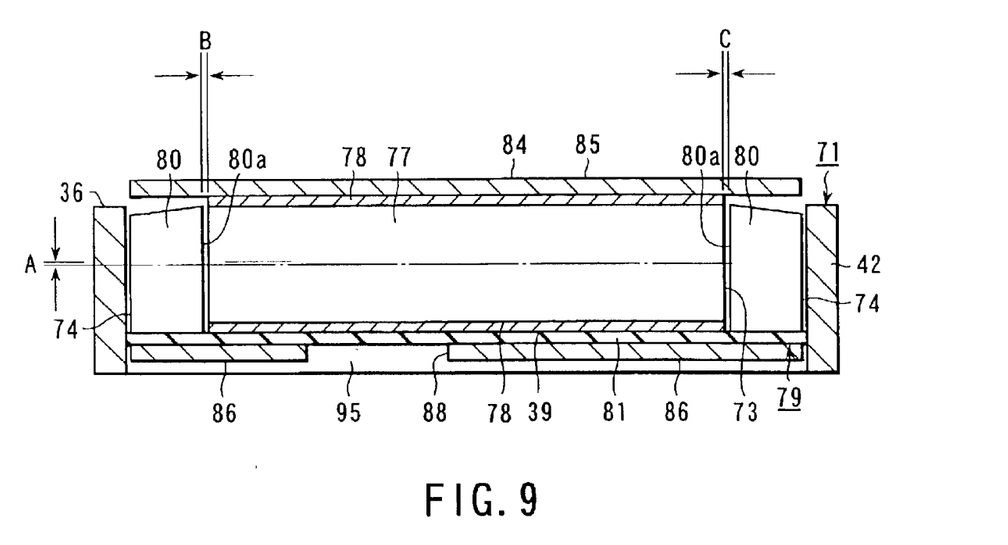
FIG. 9 is a cross-sectional view of the front light unit shown in FIG. 8.

As shown in FIGS. 8 and 9, a fifth embodiment of the invention differs from the fourth embodiment with respect to the structure of the rear case 42.

The rear case 42 has an opening portion 95 at the bottom surfaces of the light guide stick receiving portion 73 and LED receiving portions 74. The LEDs 80 and wiring portion 81 of printed wiring board 39 can be inserted through the opening portion 95. The end portion 42a of rear case 42 has a notch portion 96 communicating with the opening portion 95 on the back side. The holder 84 is engaged with the notch portion 96. The notch portion 96 has an insertion groove 97 that communicates with the opening portion 95. The lead-out portion 82 of printed wiring board 39 is led out through the insertion groove 97.

A method of assembling the light source section 38 of front light unit 36 will now be described.

The LEDs 80 and wiring portion 81 of printed wiring board 39 are inserted in the opening portion 95 from the back side of rear case 42. The LEDs 80 are placed in the LED receiving portions 74 of rear case 42. The light guide stick 77, to which the reflection sheet 78 is attached, is interposed between the LEDs 80. The light guide stick 77 is placed in the light guide stick receiving portion 73 of rear case 42.

Subsequently, the holder 84 is fitted on the end portion 42a of rear case 42. The holder 84 integrally holds the light guide stick 77, the printed wiring board 39 of LEDs 80, and the rear case 42. The holder portion 86 of holder 84 is engaged with the notch portion 96, and the end portion 42a of rear case 42, light guide stick 77 and LEDs 80 can be sandwiched by the holder portions 85 and 86.

According to the fifth embodiment, the same operational advantages as with the third and fourth embodiments are obtained. In addition, the efficiency of light incidence from the LEDs 80 to light guide stick 77 can be enhanced, a sufficient amount of emission light is obtained from the light guide body 37, and no problems occur with the front light unit.

The front light unit 36 is not limited to the structures of the third to fifth embodiments. The same advantages as with the third to fifth embodiments can be obtained, if the light guide stick 77 and LEDs 80 are mounted in the rear case 42 of protection member 71, and the light guide stick 77 and LEDs 80 are sandwiched by the holder 84 and held to the rear case 42.

As has been described above, according to the LCD apparatus of the present invention, the front light unit is constructed such that the frame-shaped protection member is attached to the peripheral portion of the light guide body. Thus, at the time of fabrication, the front light unit can be handled by holding the protection member. Since the light guide body is handled without the need to directly hold it, no problem occurs with the front light unit and the productivity is enhanced.

The present invention is not limited to the above-described embodiments. In the respective stages of carrying out the invention, various modifications and alterations can be made without departing from the spirit of the invention. The embodiments may be combined as much as possible, when they are carried out. In such cases, advantages can be obtained by combinations.

What is claimed is:

1. A liquid crystal display apparatus including:
a liquid crystal panel in which a liquid crystal layer is interposed between a pair of substrates;
a front light unit that illuminates the liquid crystal panel; and
a cell case that cooperates with the front light unit to sandwich the liquid crystal panel,
wherein the front light unit comprises a light source section, a plate-shaped light guide body that guides light from the light source section to the liquid crystal panel, and a frame-shaped protection member mounted on a peripheral portion of the light guide body and engaged with the cell case, integrally holding the liquid crystal panel and the light guide body,
the protection member comprises a frame-shaped first protection body disposed on one major surface side of the light guide body, and a frame-shaped second protection body disposed on another major surface side of the light guide body,
the first protection body comprises a supporting surface which is disposed on a side opposing the liquid crystal panel and which supports the light guide body in cooperation with at least one side portion having a thickness smaller than the other side portions, and
the light guide body being interposed between the first protection body and the second protection body.

2. A liquid crystal display apparatus according to claim 1, wherein said at least one side portion and the supporting surface are formed as an integral flat surface on which the light guide body is held.

3. A liquid crystal display apparatus according to claim 1, wherein the first protection body and the second protection body have engagement portions engageable with each other.

4. A liquid crystal display apparatus according to claim 1, wherein the second protection body is adhered to the first protection body to cover a peripheral portion of the light guide body.

5. A liquid crystal display apparatus according to claim 1, wherein the second protection body has a rectangular opening portion having an area less than an effective area of the light guide body.

6. A liquid crystal display apparatus according to claim 1, wherein the first protection body has a receiving portion which receives the light guide body such that the light guide body is surrounded by the side portions with greater thickness.

7. A liquid crystal display apparatus according to claim 1, wherein the first protection body has a light guide body receiving portion which receives the light guide body, and light source receiving portions which receive the light source section.

8. A liquid crystal display apparatus according to claim 7, wherein the light source section comprises a light emission portion that emits light, and a light guide stick which guides light emitted from the light emission portion to the light guide body.

9. A liquid crystal display apparatus according to claim 8, further comprising a holder permitting the light emission portion and the light guide stick contained in the light source receiving portion, to be held in the first protection body.

10. A liquid crystal display apparatus according to claim 8, wherein the light source receiving portion has a light guide stick receiving portion that receives the light guide stick formed along a side of the light guide body receiving portion, and light emission receiving portions that receive the light emission portions formed on both sides of the light guide stick receiving portion.

11. A liquid crystal display apparatus including:
a liquid crystal panel in which a liquid crystal layer is interposed between a pair of substrates;
a front light unit that illuminates the liquid crystal panel; and
a cell case that cooperates with the front light unit to sandwich the liquid crystal panel,
wherein the front light unit comprises a light source section, a plate-shaped light guide body that guides light from the light source section to the liquid crystal panel, and a frame-shaped protection member mounted on a peripheral portion of the light guide body and engaged with the cell case, integrally holding the liquid crystal panel and the light guide body,
said liquid crystal display apparatus further including a frame member interposed between the liquid crystal panel and the front light unit to act as a seal.

12. A liquid crystal display apparatus according to claim 11, wherein the frame member is formed of an elastic body or double-coated tape.

13. A liquid crystal display apparatus according to claim 11, wherein the frame member is attached to the liquid crystal panel.

14. A liquid crystal display apparatus according to claim 11, wherein the front light unit and the cell case have engagement portions engageable with each other.

* * * * *